United States Patent [19]

Espinoza et al.

[11] Patent Number: 5,746,822
[45] Date of Patent: May 5, 1998

[54] READY-MIXED SETTING TYPE JOINT COMPOUND

[75] Inventors: Therese A. Espinoza, Wood Dale; Charles J. Miller, McHenry; Richard B. Stevens, Lakewood, all of Ill.

[73] Assignee: United States Gypsum Company, Chicago, Ill.

[21] Appl. No.: 585,548

[22] Filed: Jan. 11, 1996

Related U.S. Application Data

[63] Continuation of Ser. No. 242,280, May 12, 1994, abandoned.

[51] Int. Cl.$^6$ .................................................... C04B 22/16
[52] U.S. Cl. .................................................... 106/785; 106/819
[58] Field of Search ................................ 106/772, 785, 106/819, 786

[56] References Cited

U.S. PATENT DOCUMENTS

| | | | |
|---|---|---|---|
| 2,113,370 | 4/1938 | Dunn et al. | |
| 2,216,207 | 10/1940 | Menoul | 106/785 |
| 3,223,082 | 12/1965 | Smith | 106/785 |
| 3,297,601 | 1/1967 | Maynard et al. | 260/17.4 |
| 3,386,223 | 6/1968 | Wegwerth | 52/741 |
| 3,520,708 | 7/1970 | Chambers | 106/785 |
| 3,852,083 | 12/1974 | Yang | 106/705 |
| 3,867,335 | 2/1975 | Reed et al. | 260/42.52 |
| 3,891,453 | 6/1975 | Williams | 106/85 |
| 3,907,725 | 9/1975 | Forte et al. | 260/17 R |
| 3,975,320 | 8/1976 | Lane et al. | 260/17 R |
| 3,998,769 | 12/1976 | Lane et al. | 260/17.4 ST |
| 4,049,866 | 9/1977 | Lane et al. | 428/402 |
| 4,075,374 | 2/1978 | Jorgenson et al. | 106/735 |
| 4,238,239 | 12/1980 | Brown | 106/116 |
| 4,286,995 | 9/1981 | Smith et al. | 106/109 |
| 4,294,622 | 10/1981 | Brown | 106/314 |
| 4,370,167 | 1/1983 | Mudd | 106/119 |
| 4,454,267 | 6/1984 | Williams | 524/43 |
| 4,494,990 | 1/1985 | Harris | 106/732 |
| 4,525,388 | 6/1985 | Rehder et al. | 427/221 |
| 4,657,594 | 4/1987 | Struss | 106/308 N |
| 4,661,161 | 4/1987 | Jakacki et al. | 106/112 |
| 4,686,253 | 8/1987 | Struss et al. | 524/44 |
| 4,824,879 | 4/1989 | Montgomery et al. | 524/43 |
| 4,849,018 | 7/1989 | Babcock et al. | 106/695 |
| 5,116,222 | 5/1992 | Futami et al. | 433/48 |
| 5,258,069 | 11/1993 | Knechtel et al. | 106/208 |
| 5,336,318 | 8/1994 | Attard et al. | 106/780 |
| 5,366,547 | 11/1994 | Brabston et al. | 106/690 |

FOREIGN PATENT DOCUMENTS

| | | |
|---|---|---|
| 0127256 | 7/1985 | Japan. |
| 1013432 | 4/1983 | U.S.S.R. |

OTHER PUBLICATIONS

Chemical Abstract "Industrial Testing of Gypsum Company" Sidorov et al. *Tr. Tatar Neft. Issled Instit.* (1966) No. 9 pp. 167–174 (see abstract).

"Magnesia–Phosphate Colored Company" Baba et al. JP 04–119951, (Aug. 10, 1992) (see abstract.

*Primary Examiner*—Paul Marcantoni
*Attorney, Agent, or Firm*—David F. Janci; Robert H. Robinson; John M. Lorenzen

[57] ABSTRACT

A cementitious composition of the setting type which can be kept in a ready-mixed state and which can be caused to set and harden upon introduction of an accelerator with reproducibility and set time predictability. The cementitious base composition contains calcium sulfate hemihydrate as a principal filler material and certain non-calcium bearing phosphate additives which prevent setting action in the presence of water. An accelerator, such as zinc sulfate, may be added to the ready-mixed, cementitious composition to initiate the setting action, or the ready-mixed cementitious composition can be used as a drying type joint compound without the addition of an accelerator.

18 Claims, No Drawings

READY-MIXED SETTING TYPE JOINT COMPOUND

This is a continuation of U.S. application Ser. No. 08/242,280 filed on May 12, 1994 now abandoned.

BACKGROUND OF THE INVENTION

1. Field of the Invention

This invention relates to a cementitious composition which is relatively stable in a ready-mixed state (i.e. preblended with water) and which can be set and hardened upon the introduction of an accelerator into the composition. The ready-mixed, cementitious compositions of this invention are useful in a variety of applications, including but not limited to, joint compounds for finishing seams between gypsum drywall panels, firestop compounds, ornamental and casting plasters, spackling compounds, and basecoat and finishing plasters (including veneer finishes). The ready-mixed, cementitious composition when made as a joint compound can also be used as a drying type joint compound without adding an accelerator.

2. Description of the Prior Art

Walls made from gypsum wallboard are conventionally constructed by attaching the wallboard panels to studs, and filling and coating the joints between the panels with a specially formulated composition called a joint compound. The wetted joint compound (taping grade) is placed within the joint formed by the abutting edges of the wallboard panels, and a paper reinforcing tape is embedded in the joint with the joint compound which is then permitted to dry. When the joint compound is dry, a second joint compound (topping grade) is applied over the joint, and it too is permitted to dry. Thereafter, the joint compound may be lightly sanded and the wall may be conventionally finished with a decorative coating (paint, texture or wallpaper); or if necessary to hide the joint, there may be a third application of a joint compound, and after it is dry, it may be lightly sanded and a decorative coating applied to the wall. Instead of using two grades of joint compound, an all purpose joint compound is commercially available which is used both for embedding the tape and for the finish coat(s). If a fiberglass reinforcing tape is used, it is applied to the wall prior to the application of joint compound. The joint compound is applied over the fiberglass tape and forced through the tape.

Conventionally, all joint compounds contain a filler, a binder and a thickener. The taping grade joint compound generally contains more binder than the topping grade. The conventional fillers are calcium carbonate, calcium sulfate dihydrate (gypsum), and calcium sulfate hemihydrate (plaster of Paris). The calcium sulfate hemihydrate is used only in setting type joint compounds as disclosed in U.S. Pat. No. 3,297,601. However, in current construction practices, generally it is preferred to use a ready-mixed, pre-wetted, drying type joint compound which contains either a calcium carbonate or gypsum filler.

Conventional drying type joint compounds do encounter shrinkage problems which makes it difficult to achieve a smooth wall surface. Shrinkage of these prior art joint compounds upon drying may be particularly troublesome if a second coat is applied over an earlier coat which is not completely dried. The areas coated or filled with the incompletely dried joint compound subsequently shrink, which may occur even after the wall is finished and decorated. In some cases, where delayed shrinkage is excessive, it may require the applicators to return to the job site for refinishing and redecorating.

Previously, there was a substantial need in the joint compound industry for a joint compound which will set or harden quickly, thereby reducing the time required for gypsum drywall construction, and preferably, there would be less shrinkage. This type of joint compound would be a significant advance in the art and would substantially reduce the expense and time required for finishing and decorating wall surfaces.

In order to overcome the disadvantages of the drying type joint compounds, powdered setting type joint compounds have been developed. In the setting type compounds, calcium sulfate hemihydrate (calcined gypsum) is used as the principal filler material. The powdered compound is dry blended and mixed with water when ready for use. The water reacts with the calcium sulfate hemihydrate to form set gypsum (calcium sulfate dihydrate). In this compound, the setting time is considerably shorter than the time required for the drying type to dry. However, the setting type joint compounds have the disadvantage that they cannot be prepared as ready-mixed joint compounds, for when mixed with water they have only a short usable life and cannot be stored in the wetted condition.

The prior art, in U.S. Pat. No. 4,661,161, does disclose a ready-mixed, setting type joint compound. This patent describes a two component composition with a premixed, cementitious component comprising a wetted calcium sulfate hemihydrate, conventional joint compound binders and thickeners, and a combination set retarder comprising a proteinaceous ingredient formed from animal tissues and a chelating agent effective in chelating calcium ions. The other component, an accelerator, comprises a compound having a higher log K value than calcium such as compounds with ferric ions (e.g. ferric sulfate). The patent discloses that the cementitious component has an adequately long shelf life for commercialization. When the two components are mixed, the cementitious component hydrates after a suitable period to form a set material having acceptable joint compound properties.

However, it was discovered that the ready-mixed, setting type joint compound disclosed in U.S. Pat. No. 4,661,161 could not be developed commercially because of problems with the shelf life of the ready-mixed, cementitious component. The activity of the set retarder blend in the ready-mixed, cementitious component was found to degrade upon aging, causing the cementitious component to set in the packaging without the addition of the accelerator. Furthermore, when the ready-mixed, cementitious component aged on the shelf, the set time of the system was substantially reduced, uncontrollable and unpredictable.

SUMMARY OF THE INVENTION

This invention comprises a cementitious composition of the setting type which can be kept in a ready-mixed state (premixed with water) and which can be caused to set and harden upon introduction of an accelerator with reproducibility and set time predictability. It has been discovered that a cementitious base composition containing calcium sulfate hemihydrate as a principal filler material can be pre-mixed with water and certain non-calcium bearing phosphate additives which prevent setting action in the presence of water. An accelerator may be added to the ready-mixed, cementitious base to initiate the setting action, or the ready-mixed, cementitious composition can be used as a drying type joint compound without the addition of an accelerator.

It is an object of this invention to provide a ready-mixed, setting type joint compound which has a shelf life of at least about several months.

It is another object of the invention to provide a setting type joint compound for use in filling and sealing the joints between adjacent wallboards, wherein the joint compound has a relatively short setting time after activation with an accelerator.

It is a further object of the invention to provide a setting type joint compound which can be used for finishing the joints between adjacent wallboards and which exhibits comparatively low shrinkage.

A still further object of this invention is to provide a ready-mixed, cementitious composition which is useful as either a setting type joint compound when mixed with an accelerator or as a drying type joint compound when used without an accelerator.

Other objects and advantages of the ready-mixed, cementitious compositions of this invention will become apparent in view of the following description of the preferred embodiments.

DESCRIPTION OF THE PREFERRED EMBODIMENTS

A cementitious composition has been developed which has excellent shelf life in a ready-mixed state (premixed with water) upon the incorporation of a special retarder additive in the ready-mixed composition. The key ingredient in the cementitious composition is a long term retarder which maintains the ready-mixed, cementitious base in an unset state, whereas the presence of water would normally set the calcium sulfate hemihydrate filler. The additives that have been discovered to provide the long term retardation effect in ready-mixed, cementitious compositions are non-calcium bearing phosphates. In particular, (1) zinc hexametaphosphate and (2) potassium tripolyphosphate have been found to provide the long term retardation effect, with (3) tetra sodium pyrophosphate providing the most long lasting set retardation effect. Other effective set retarders include (4) sodium tripolyphosphate, monoammonium phosphate and (6) monobasic potassium phosphate.

In general, the set retardation effect is provided by low levels of the phosphate additive, with the amount ranging from about 0.1 to about 10% by weight based on the total composition weight not including the water. In addition to the calcium sulfate hemihydrate filler, calcium carbonate may also be present as a filler.

As noted above, the principal ingredient in the cementitious base composition is the calcium sulfate hemihydrate filler. This ingredient enables the composition to function as a setting type compound. It has been found that the alpha crystalline form of the calcium sulfate hemihydrate is preferred for long term maintenance of an unset, ready-mixed composition containing the non-calcium bearing phosphates. In general, at least about twenty percent (20%) by weight of the unwetted cementitious base composition is calcium sulfate hemihydrate, which may range up to about ninety-nine percent (99%) by weight. In addition, calcium carbonate may also be present as a filler. The calcium carbonate may be present in amounts ranging up to about seventy-five percent (75%) by weight of the unwetted, cementitious base composition.

In preparing the cementitious base composition as a joint compound, conventional joint compound ingredients may be incorporated into the composition. The latex emulsion binder is an important ingredient which is well known to those skilled in the joint compound art. Any of the conventional latex binders may be used with polyvinyl acetate and ethylene vinyl acetate emulsions being preferred. In general, if present, the latex binder ranges from about 1% to about 15% by weight of the composition prior to adding water.

It is generally preferred that the cementitious base composition, if used as a joint compound, contain a minor amount of a cellulosic thickener. The conventional cellulosic thickeners, e.g. ethylhydroxy ethylcellulose, hydroxypropyl methylcellulose, methylhydroxypropyl cellulose and hydroxyethyl cellulose, may be used in the joint compounds of this invention. The amount of cellulosic thickener, if present, may range from about 0.1% to about 2% by weight of the total composition ingredients (not including the water added to make it a ready-mix compound).

The joint compound of this invention may also contain a non-leveling agent such as attapulgus clay. This ingredient provides non-leveling, slip and water retention which had previously been provided by asbestos. It has been found that attapulgus clay does provide a joint compound having good working properties. In general, the amount of the non-leveling agent, if present, ranges from about 1% to about 10% by weight of the base composition prior to adding water. Other clays such as sepiolite, bentonite and montmorillonite may also be used in the joint compound.

Conventional ready-mixed joint compounds frequently contain mica, talc or sericite to provide resistance to cracking upon drying. These ingredients can be omitted from the joint compounds of this invention which have excellent resistance to cracking without using mica or talc; however, it may be desired to include minor amounts of mica or talc in the formulation to provide improved slip and workability. When used in the joint compounds of this invention, the mica or talc may be between about 2% and about 15% by weight of the composition prior to adding water.

It is preferred that the ready-mixed joint compounds of this invention have a pH in the range of 7-8. In some cases it may be necessary to use an additive, such as citric acid, to lower the pH. In general, the pH control additive may be present in amounts ranging from 0.1-1% by weight of the joint compound composition.

Additional ingredients frequently used in joint compounds are preservatives, wetting agents, defoamers and plasticizers. These ingredients, if present, are also used in minor amounts generally ranging from about 0.05% to about 1% by weight of the composition prior to adding water.

If a lightweight, ready-mixed joint compound is desired, the lightweight property can be provided by incorporating a specially treated expanded perlite into the formulation in accordance with the disclosure in U.S. Pat. No. 4,454,267. It is well known in the art that it is preferred that the expanded perlite should have a particle size which will pass through a 100 mesh screen if it is to be incorporated into a joint compound. In a ready-mixed joint compound, the expanded perlite is preferably treated to render it water-insensitive. There are several ways to render the expanded perlite water-insensitive, one of which is disclosed in U.S. Pat. No. 4,525,388. The preferred method is to treat the expanded perlite with a silicone or silane compound, but other materials may be used to render it water-insensitive (i.e., water-repellent). The specially treated expanded perlite is commercially available from suppliers such as Silbrico Corporation.

In order to achieve the desired lightweight properties, the treated expanded perlite should be present in amounts of at least about 3% by weight of all of the ingredients in the ready-mixed cementitious compound, excluding the water. It is particularly preferred that the treated expanded perlite be present in amounts between about 5% and about 10% by weight of all of the ingredients in the joint compound, excluding the water.

The ready-mixed cementitious composition of this invention is capable of functioning as a setting type joint compound upon activation by an accelerator which initiates the setting action. The accelerator overcomes the effect of the phosphate retarder additive and enables the calcium sulfate hemihydrate to set. Suitable accelerator materials are compounds having cations which have a higher log K value than calcium. Table I lists a series of metal ions in the order of their log K value measured by using a diethylene triamine pentaacetic acid chelating agent for calcium ions. "K" is the equilibrium constant of the chelating reaction of diethylene triamine pentaacetic acid with a given metal cation.

TABLE I

| Metal Ion | Log K Value |
|---|---|
| Ferric | 28.6 |
| Mercury | 26.7 |
| Cupric | 21.03 |
| Nickel | 20.21 |
| Cobalt | 19.0 |
| Cadmium | 18.93 |
| Lead | 18.87 |
| Zinc | 18.14 |
| Ferrous | 16.66 |
| Aluminum | 16.0 |
| Manganese | 15.11 |
| Calcium | 10.63 |

Several materials have been found which will initiate the setting action of ready-mixed, cementitious compositions which have been stabilized with a phosphate retarder. It has been found that zinc sulfate is a superior material for use as an accelerator with the cementitious compositions of this invention. Some of the materials which have high log K values and qualify as accelerators may adversely affect properties of the accelerated mixture and therefore are not preferred. These adverse effects may be poor dimensional stability, lack of bond, moisture release and increased viscosity. Aluminum sulfate is an accelerator which is not preferred due to such adverse effects when used to accelerate formulations containing calcium carbonate. Accelerators containing ferrous ions are also not recommended because of staining of finished walls and ceilings when joint compounds containing such ions were used. It may be desirable to incorporate a pigment with the accelerator component in order to provide a visual indicator of the uniformity of blending the accelerator with the ready-mixed, cementitious composition. A preferred accelerator blend is 95% by weight of zinc sulfate and 5% red iron oxide.

It has also been discovered that the ready-mixed, cementitious composition, if used without the addition of an accelerator, will function as a drying type joint compound. In addition, the ready-mixed cementitious compositions of this invention are useful in a variety of applications, including but not limited to, joint compound for finishing seams between gypsum drywall panels, firestop compounds, ornamental and casting plasters, moulding plasters, spackling compounds, and basecoat and finishing plasters (including veneer finishes), when mixed with appropriate additional ingredients.

When used as firestop compounds, it is preferred to incorporate a reinforcing fiber, such as cellulose fibers, in the composition. The reinforcing fiber generally ranges from about 0.01% to about 5% of the dry weight of the composition.

The ready-mixed, cementitious compositions of this invention may contain the following ingredients:

TABLE II

| Ingredient | Amount (wt. %) |
|---|---|
| Filler: | |
| Calcium Sulfate Hemihydrate | 20–90 |
| Calcium Carbonate | 0–75 |
| Binder: (if desired) | |
| Latex Emulsion | 1–15 |
| Non-Leveling Agent: (if desired) | |
| Attapulgus Clay | 1–10 |
| Thickener: (if desired) | |
| Cellulosic Material | 0.1–2 |
| Retarder: | |
| Phosphate Compound | 0.1–10 |
| Preservatives | 0.05–1 |
| Lightweight Ingredient (if desired) | |
| Treated, Expanded Perlite | 3–25 |
| Water | As Required |

The ready-mixed, cementitious composition may be prepared by adding a mixture of the filler materials, a lightweight ingredient if desired, a thickener, a non-leveling agent and a retarder additive to a mixer containing water, latex binder and preservatives. The mixture may be blended until smooth and then packaged in a plastic container. For some joint compounds, particularly those which do not contain a lightweight ingredient, it may be desirable to subject the blended mixture to a vacuum prior to packaging. In general, enough water is added to the composition to yield a finished Brabender viscosity of about 300–600 BU as measured on a VC-3 Brabender viscometer. Viscosity measured at room temperature (about 25° C.) using a 250 centimeter-gram torsion head operated at a 75–78 r.p.m. spindle speed.

In compliance with the requirements of 35 U.S.C. 112, the following operating examples disclose the best mode for carrying out the invention known to the inventors at this time. In these operating examples, a Molytek Data Acquisition System Product, a 32 channel recorder, was used to determine set times. The Molytek instrument plots temperature vs. time. Molytek set of the joint compound is considered to be the time of maximum temperature rise. The shrinkage and the one eighth inch crack test were performed in accordance with ASTM C474. The accelerator used in the operating examples was a blend of 95% zinc sulfate and 5% red iron oxide. Since it is well known in the joint compound art that setting type compounds have good crack resistance and shrinkage properties, these tests were not run on the setting type compounds.

EXAMPLE 1

A ready-mixed, setting type, lightweight joint compound was prepared using the preferred retarder, tetra sodium pyrophosphate (TSPP), and the preferred zinc sulfate accelerator. The cementitious component was prepared using the following formulation:

| Ingredient | Amount (gram) | Dry Weight % |
|---|---|---|
| Calcium Sulfate Hemihydrate (alpha) | 996.8 | 66.45 |
| Calcium Carbonate Filler | 225 | 15 |
| Attapulgus Clay | 75 | 5 |
| Hydroxypropyl Methylcellulose Thickener (Methocel 250S) | 5.25 | 0.35 |
| Treated Expanded Perlite (Silbrico 35-34) | 105 | 7 |
| TSPP Retarder | 6 | 0.4 |
| Citric Acid | 1.5 | 0.1 |
| Ethylene Vinyl Acetate Polymer Binder (55% Solids) (Elvace 40-716) | 150 | 5.5 solids |
| Fungicide (Fungitrol 158) | 1.5 | 0.1 |
| Bactericide (Nuosept 91) | 1.5 | 0.1 |
| Water | 800 | |

The above-listed dry ingredients were added to a mixer containing water, the latex binder and the preservatives. The final amount of water was 800 cubic centimeters to yield a finished Brabender viscosity of 500 BU (with pin). The mixture was blended until smooth and then packaged in a plastic container for storage.

Aging of the composition was conducted at room temperature After 175 days, the composition had not set.

A portion of the composition was tested as a drying type joint compound using no accelerator. In the one eighth inch crack test, there were no cracks. In the shrinkage test, there was 20.3% shrinkage.

Two 100 gram portions of the composition were tested as setting type joint compounds using a powdered zinc sulfate accelerator. 2.5 grams of accelerator blend was added to one portion which set (Molytek) in 53 minutes, but the composition was somewhat heavy during mixing with the accelerator. 1.5 grams of accelerator blend was added to the other 100 gram portion which set (Molytek) in 80 minutes, and the composition remained smooth and creamy during mixing with the zinc sulfate.

EXAMPLE 2

Another ready-mixed, setting type, lightweight joint compound was prepared using zinc hexametaphosphate as the retarder and the preferred zinc sulfate accelerator. The ingredients and the amounts were exactly the same as in Example 1, with the exception that 6 grams of zinc hexametaphosphate was substituted for the TSPP retarder. The final amount of water used was 815 cubic centimeters to yield a finished Brabender viscosity (with pin) of 500 BU. The composition was blended until smooth and then packaged in a plastic container for storage.

Aging of the composition was at room temperature. After 175 days, the composition had not set.

A portion of the composition was tested as a drying type joint compound using no accelerator. In the one eighth inch crack test, there was only slight check cracking. In the shrinkage test, there was 22.3% shrinkage.

Two 100 gram portions of the composition were tested as setting type joint compound using a powdered zinc sulfate accelerator. 2.5 grams of accelerator blend was added to one portion which set (Molytek) in 57 minutes, but the composition was somewhat heavy during mixing with the accelerator. 1.5 grams of accelerator blend was added to the other 100 gram portion which set (Molytek) in 92 minutes, with the composition being somewhat heavy during mixing.

EXAMPLE 3

A ready-mixed, setting type, lightweight joint compound was prepared using sodium tripolyphosphate as the retarder and the preferred zinc sulfate accelerator. The ingredients and the amounts were the same as in Examples 1 and 2, with the exception that 6 grams of sodium tripolyphosphate was used as the retarder. The total amount of water used was 900 cubic centimeters to yield a final Brabender viscosity (with pin) of 325 BU. The composition was blended until smooth and then packaged in a plastic container for storage.

Aging of the composition was conducted at room temperature. After 175 days, the composition had not set.

A portion of the composition was tested as a drying type joint compound using no accelerator. In the one eighth inch crack test, there was only trace check cracking. In the shrinkage test, there was 24.2% shrinkage.

Two 100 gram portions of the composition were tested as setting type joint compounds using a powdered zinc sulfate accelerator. 2.5 grams of accelerator blend was added to one portion which set (Molytek) in 64 minutes, but the composition was somewhat heavy during mixing with the zinc sulfate. 1.5 grams of accelerator blend was added to the other 100 gram portion which set (Molytek) in 113 minutes, and the composition remained smooth and creamy during mixing with the zinc sulfate.

EXAMPLE 4

A ready-mixed, setting type, lightweight joint compound was prepared using potassium tripolyphosphate as the retarder and the preferred zinc sulfate accelerator. The ingredients and the amounts were the same as in Examples 1–3, with the exception that 6 grams of potassium tripolyphosphate was used as the retarder. The total amount of water used was 875 cubic centimeters to yield a final Brabender viscosity (with pin) of 480 BU. The composition was blended until smooth and then packaged in a plastic container for storage.

Aging of the composition was conducted at room temperature. After 175 days the composition had not set.

A portion of the composition was tested as a drying type joint compound using no accelerator. In the one eighth inch crack test, there was only a faint trace of check cracking. In the shrinkage test, there was 23% shrinkage.

Two 100 gram portions of the composition were tested as setting type joint compounds using a powdered zinc sulfate accelerator. 2.5 grams of accelerator blend was mixed with one portion which set (Molytek) in 68 minutes, and the composition remained smooth and creamy during mixing with the zinc sulfate. 1.5 grams of accelerator blend was added to the other 100 gram portion which set (Molytek) in 93 minutes, again with easy mixing with the accelerator blend.

EXAMPLE 5

A ready-mixed, setting type, lightweight joint compound was prepared using monoammonium phosphate as the retarder and the preferred zinc sulfate accelerator. The ingredients and the amounts were the same as in Examples 1–4, with the exception that 6 grams of monoammonium phosphate was used as the retarder. The total amount of water used was 800 cubic centimeters to yield a final Brabender viscosity (with pin) of 510 BU. The composition was blended until smooth and then packaged in a plastic container for storage.

Aging of the composition was conducted at room temperature. After 175 days the composition had not set.

A portion of the composition was tested as a drying type joint compound using no accelerator. In the one eighth inch crack test, there was only trace of check cracking. In the shrinkage test, there was 21.7% shrinkage.

Two 100 gram portions of the composition were tested as setting type joint compounds using a powdered zinc sulfate accelerator. 2.5 grams of accelerator blend was mixed with one portion which was set (Molytek) in 34 minutes, and the composition was extremely heavy during mixing with the zinc sulfate. 1.5 grams of accelerator blend was mixed with the other 100 gram portion which set (Molytek) in 37 minutes, and the composition was heavy and sticky during mixing.

EXAMPLE 6

Two ready-mixed, setting type, lightweight joint compounds were prepared using tribasic calcium phosphate in one of the compounds and dibasic calcium phosphate in the other compound as the retarder. The ingredients and the amounts were the same as in Examples 1-5, with the exception that 6 grams of the calcium phosphates were used as the retarder in the compounds. The total amount of water used was 800 cubic centimeters. Both joint compounds set at room temperature in less than 16 hours and the test was discontinued.

EXAMPLE 7

A ready-mixed, setting type, lightweight joint compound was prepared using monobasic potassium phosphate as the retarder and the preferred zinc sulfate accelerator. The ingredients and the amounts were the same as in Examples 1-6, with the exception that 6 grams of monobasic potassium phosphate was used as the retarder. The total amount of water used was 800 cubic centimeters to yield a final Brabender viscosity (with pin) of 485 BU. The composition was blended until smooth and then packaged in a plastic container for storage.

Aging of the composition was conducted at room temperature. After 175 days the composition had not set.

A portion of the composition was tested as a drying type joint compound using no accelerator. In the one eighth inch crack test, there was only a trace to slight check cracking. In the shrinkage test, there was 20.6% shrinkage.

Two 100 gram portions of the compositions were tested as setting type joint compounds using a powdered zinc sulfate accelerator. 2.5 grams of accelerator blend was mixed with one portion which set (Molytek) in 32 minutes, and the composition was extremely heavy during mixing with the zinc sulfate. 1.5 grams of accelerator blend was mixed with the other 100 gram portion which set (Molytek) in 35 minutes, and the composition was heavy and sticky during mixing.

EXAMPLE 8

A plant trial formulation of ready mixed, lightweight, setting type joint compound was prepared using the following formulation:

| Raw Material | Amount (lbs.) |
| --- | --- |
| Calcium Sulfate Hemihydrate (alpha) | 675 |
| Calcium Carbonate Filler | 150 |
| Attapulgus Clay | 50 |
| Hydroxypropyl Methylcellulose Thickener | 3.5 |
| Treated, Expanded Perlite (Silbrico 43-23) | 86 |
| Tetra Sodium Pyrophosphate Retarder | 4 |

-continued

| Raw Material | Amount (lbs.) |
| --- | --- |
| Citric Acid | 1 |
| Ethylene Vinyl Acetate Polymer Binder (55% Solids) | 100 |
| Fungitrol 158 | 1 |
| Nuosept 91 | 1 |
| Water | 617 (74 gal.) |

The raw materials were weighed separately and blended with water in a horizontal shaft paddle mixer until uniformly dispersed. In this trial, 50 gallons of start water was used and additional water was added periodically to adjust the viscosity. 24 gallons of water was added to the initial mix, thereby using a total of 74 gallons. The final mix Brabender (with pin) viscosity was 260 B.U. The final mix was packaged in containers, and after storage for 12 months at room temperature, the composition had not set.

100 gram samples of the final mix were tested for set time (Molytek) prior to storage, using a variable amount of zinc sulfate accelerator blend. These results were as follows:

| Accelerator Amount (g) | Molytek Set Time (min.) |
| --- | --- |
| 2.5 | 39 |
| 2.0 | 44 |
| 1.5 | 62 |
| 1.0 | 93 |

After a few days storage, a portion of the composition was evaluated for its unaccelerated joint compound application properties. The mix still had a low viscosity (260 BU). Upon application with a 10 inch knife, the joint compound exhibited a soft, wet spread but no flow problems.

EXAMPLE 9

A composition in accordance with this invention which is useful as a firestop material was prepared in accordance with the following formulation:

| Raw Material | Amount (lbs.) |
| --- | --- |
| Calcium Sulfate Hemihydrate (alpha) | 675 |
| Calcium Carbonate Filler | 150 |
| Attapulgus Clay | 50 |
| Ethylene Vinyl Acetate Polymer Binder (55% solids) | 100 |
| Hydroxypropyl Methylcellulose Thickener | 3.5 |
| Citric Acid | 1 |
| Treated Expanded Perlite (Silbrico 35-23) | 70 |
| Cellulose Fiber (Kayocel 6Bk50F) | 8 |
| Tetra Sodium Pyrophosphate Retarder | 4 |
| Bactericide (Nuosept 91) | 1 |
| Fungicide (Fungitrol 158) | 1 |
| Water | 542 (65 gal.) |

This firestop compound was subjected to a fire test in accordance with ASTM E 814 and passed said test.

EXAMPLE 10

A joint compound composition in accordance with this invention was prepared using the following formulation:

| Ingredient | Amount (gram) | Dry Weight % |
| --- | --- | --- |
| Calcium Sulfate Hemihydrate (beta) | 987.8 | 65.85 |
| Calcium Carbonate Filler | 225 | 15.0 |
| Attapulgus Clay | 75 | 5.0 |
| Hydroxypropyl Methycellulose Thickener | 5.25 | 0.35 |
| Treated Expanded Perlite (Silbrico 35-23) | 105 | 7.0 |
| TSPP Retarder | 15 | 1.0 |
| Citric Acid | 1.5 | 0.10 |
| Ethylene Vinyl Acetate Polymer Binder (55% Solids) | 150 | 5.50 |
| Fungicide (Fungitrol 158) | 1.5 | 0.10 |
| Bactericide (Nuosept 91) | 1.5 | 0.10 |

The above-listed dry ingredients were added to a mixer containing water, the polymer binder and the fungicide and bactericide. The final amount of water was 960 cubic centimeters to yield a finished Brabender viscosity (with pin) of 460. The mixture was blended until smooth and then packaged in a plastic container for storage. After four weeks, the composition had not set.

A portion of the composition was tested as a drying type joint compound using no accelerator. The composition had a wet density of 10.8 pounds per gallon. In the one eighth inch crack test, there was only a faint trace of check cracking. In the shrinkage test, there was 19.1% shrinkage. Its application properties were slightly heavy and a trace dry spread, but it had light body and provided good edges.

Two 100 gram portions of the composition were tested as setting type joint compounds using a powdered zinc sulfate accelerator. 2 grams of accelerator blend was added to one portion which set (Molytek) in 37 minutes, but the composition was slightly heavy during mixing. 1 gram of accelerator blend was added to the other 100 gram portion which set (Molytek) in 83 minutes, and the composition remained soft during mixing with the zinc sulfate.

EXAMPLE 11

A standard density joint compound (not lightweight) was prepared using the following formulation:

| Ingredient | Amount (gram) | Dry Weight % |
| --- | --- | --- |
| Calcium Sulfate Hemihydrate (alpha) | 1269 | 63.45 |
| Calcium Carbonate Filler | 300 | 15.0 |
| Mica | 200 | 10.0 |
| Attapulgus Clay | 100 | 5.0 |
| Hydroxylpropyl Methylcellulose Thickener | 7 | 0.35 |
| TSPP Retarder | 8 | 0.40 |
| Citric Acid | 2 | 0.10 |
| Ethylene Vinyl Acetate Polymer Binder (55% Solids) | 200 | 5.5 |
| Fungicide (Fungitrol 158) | 2 | 0.10 |
| Bactericide (Nuosept 91) | 2 | 0.10 |

The dry ingredients were added to a mixer containing water, the polymer binder, and the fungicide and bactericide. The final amount of water was 900 cubic centimeters to yield a finished Brabender viscosity (with pin) of 530. The mixture was blended until smooth and then packaged in a plastic container for storage. After four weeks, the composition had not set.

A portion of the composition was tested as a drying type joint compound using no accelerator. The composition had a wet density of 13.2 pounds per gallon. In the one eighth inch crack test, there was moderate fissure and check cracking. In the shrinkage test, there was a 25.9% shrinkage. It provided a soft, wet, buttery spread when applied to a wallboard joint.

Three 100 gram portions of the composition were tested as setting type joint compounds using a zinc sulfate accelerator blend. 2 grams of accelerator blend was added to one portion which set (Molytek) in 67 minutes, but the composition was slightly heavy during mixing. 1.5 grams of accelerator blend was added to another 100 gram portion which set (Molytek) in 99 minutes, and the composition remained soft during mixing. 1 gram of accelerator blend was added to the third 100 gram portion which set (Molytek) in 181 minutes, and this composition also remained soft during mixing.

Having completely described this invention in accordance with 35 U.S.C. 112.

What is claimed is:

1. A ready-mixed, cementitious composition which forms a setting type joint compound when mixed with an accelerator for the reaction of calcium sulfate hemihydrate with water to form set gypsum, said composition comprising from about 20 to about 99 weight percent (based on total solids used to form the composition) of a calcium sulfate hemihydrate filler, a calcium carbonate filler, from about 1 to about 10 weight percent (based on total solids used to form the composition) of a sepiolite, bentonite, or attapulgus clay, from about 0.1 to about 10 weight percent (based on total solids used to form the composition) of a non-calcium bearing phosphate set retarder which maintains said cementitious composition in an unset state for at least 175 days, a binder, a thickener and water.

2. The composition of claim 1 in which the non-calcium bearing phosphate set retarder is selected from zinc hexametaphosphate, potassium tripolyphosphate, tetra sodium pyrophosphate, sodium tripolyphosphate, monoammonium phosphate, and monobasic potassium phosphate.

3. The composition of claim 1 in which the calcium sulfate hemihydrate is the alpha crystalline form.

4. The composition of claim 1 in which an expanded perlite treated with a material to render it water-repellent is present in the composition to provide a lightweight composition.

5. The composition of claim 1 which contains from about 0.01% to about 5% by dry weight of a reinforcing fiber.

6. The composition of claim 1 in which the calcium sulfate hemihydrate is the beta crystalline form.

7. A ready-mixed, cementitious composition comprising from about 20 to about 99 weight percent (based on total solids used to form the composition) of a calcium sulfate hemihydrate filler, from about 1 to about 10 weight percent (based on total solids used to form the composition) of a sepiolite, bentonite, or attapulgus clay, from about 0.1 to about 10 weight percent (based on total solids used to form the composition) of a non-calcium bearing phosphate set retarder which maintains said cementitious composition in an unset state for at least 175 days, and water.

8. The composition of claim 7 in which the calcium sulfate hemihydrate is the alpha crystalline form.

9. The composition of claim 7 in which the calcium sulfate hemihydrate is the beta crystalline form.

10. The composition of claim 7 in which the non-calcium bearing phosphate set retarder is selected from zinc hexametaphosphate, potassium tripolyphosphate, tetra sodium pyrophosphate, sodium tripolyphosphate, monoammonium phosphate, and monobasic potassium phosphate.

11. The composition of claim 10 in which the non-calcium bearing phosphate set retarder is present in amounts ranging from about 0.1 to about 1% by weight of the composition not including the water present therein.

12. A joint compound system comprising separately packaged components for preparing a setting type joint compound wherein the components are:

A. a cementitious composition in ready-mixed form containing from about 20 to about 99 weight percent (based on total solids used to form the composition) of a calcium sulfate hemihydrate filler, a latex binder, from about 1 to about 10 weight percent (based on total solids used to form the composition) of a sepiolite, bentonite, or attapulgus clay, from about 0.1 to about 10 weight percent (based on total solids used to form the composition) of a non-calcium bearing phosphate set retarder which maintains said cementitious composition in an unset state for at least 175 days, and water, and B. an accelerator component comprising a compound having a cation with a log K value greater than that of calcium ions, and which, when mixed with said cementitious composition, permits said cementitious composition to set.

13. The joint compound system of claim 12 in which the non-calcium bearing phosphate set retarder is selected from zinc hexametaphosphate, potassium tripolyphosphate, tetra sodium pyrophosphate, sodium tripolyphosphate, monoammonium phosphate, and monobasic potassium phosphate.

14. The joint compound system of claim 12 in which the accelerator component consists essentially of zinc sulfate.

15. The joint compound system of claim 12 in which the cementitious composition also contains a calcium carbonate filler.

16. The joint compound system of claim 12 in which the non-calcium bearing phosphate set retarder is tetra sodium pyrophophate.

17. The joint compound system of claim 12 in which the calcium sulfate hemihydrate filler is the alpha crystalline form.

18. The joint compound system of claim 12 in which the calcium sulfate hemihydrate filler is the beta crystalline form.

* * * * *